United States Patent Office 3,658,966
Patented Apr. 25, 1972

3,658,966
METHODS OF TREATING HYPERTENSION
Shigeru Tsunoo, Tokyo, Kazuyoshi Horisaka, Yokohama, Akiyuki Yamaguchi, Tokyo, Kikuo Adachi, Sagamihara-shi, and Osamu Umezawa, Tokyo, Japan, assignors to Kowa Company, Ltd., Nagoya, Japan
No Drawing. Filed Sept. 15, 1969, Ser. No. 858,130
Int. Cl. A61k 27/00
U.S. Cl. 424—315
5 Claims

ABSTRACT OF THE DISCLOSURE

A pharmaceutical composition for remedy of hypertension and hyperlipemia, which comprises 3-amino-propane sulfonic acid in an amount capable of lowering blood pressure, and a physiologically non-toxic carrier. A method of medical treatment for hypertension and hyperlipemia, which comprises administering 3-amino-propane sulfonic acid in an amount capable of lowering blood pressure. A process for the preparation of 3-amino-propane sulfonic acid, which comprises reacting 3-amino-1-propanol in an inert organic solvent with a member selected from the group consisting of thionyl chloride and chlorine compounds of phosphorus, and reacting the resulting 3-amino-1-chloropropane hydrochloride with an alkali salt of sulfurous acid.

---

This invention relates to a pharmaceutical composition having excellent activitives of lowering blood pressure and cholesterol concentration in blood with an extremely low toxicity, a method of medical treatment for hypertension and hyperlipemia with the use of such composition, and a process for the advantageous preparation of the active compound of such composition.

More specifically, this invention relates to a pharmaceutical composition for the treatment of hypotension and hyperlipemia which comprises an effective amount of 3-amino-propane sulfonic acid (which may often be called "homotaurine" hereinafter) and a physiologically non-toxic carrier; a method of medical treatment for hypertension and hyperlipemia which comprises administering an effective dose of homotaurine orally or by injection or rectal infusion; and a process for the preparation of the active compound of such composition, particularly a process for the preparation of homotaurine which comprises reacting 3-amino-1-propanol in an inert organic solvent with a member selected from the group consisting of thionyl chloride and chlorine compounds of phosphorus, and reacting the resulting 3-amino-1-chloropropane hydrochloride with an alkali salt of sulfurous acid.

Homotaurine is a known compound having a molecular weight of 139.18 and expressed by the structural formula

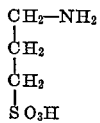

A process for the preparation of homotaurine is proposed, for instance, by German Pat. No. 931,951. At an annual meeting of Japanese Fisheries Society held in April 1969 in Tokyo, Japan, it was reported that homotaurine had been extracted from a certain kind of red duckweed together with an analogous compound, 1-amino-2-hydroxy-propane sulfonic acid, and it was proved that homotaurine is present in natural materials.

From the above mentioned German patent it has been known that homotaurine is useful as a starting material or an intermediate in the synthetic chemistry. It has been also known that homotaurine is useful as a wetting agent, a washing agent and an emulsifier [Canadian J. Chem. 40, 2189 (1962): Belgian Pat. No. 619,161].

It has been known that taurine which is a compound analogous to homotaurine and expressed by the structural formula

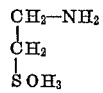

has activities of promotion secretion of bile and absorption of fat into the body, and it is used as a medicine in the field where these activities are required. Although various fundamental experiments have been conducted on taurine, a prominent function supporting the medical effect thereof or its functional mechanism has not yet been elucidated, and no report has been found concerning these matters.

It has been also known that another analogous compound, i.e., γ-aminobutyric acid, expressed by the structural formula

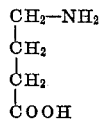

has an activity of controlling the central nervous system and acts on the buffer nerves for blood pressure in medulla oblongata. Therefore, it was once considered that γ-aminobutyric acid would be clinically applicable as a hypotensor. However, it exhibits substantially no effects as orally given at a dosage of 1.5–3 g./day and therefore, it cannot be applied to a practical use.

Medical uses or medical effects of homotaurine however have not been heretofore known, though only a few utilizations thereof have been known as mentioned above in the entirely different fields.

Research has been conducted on ω-amino-sulfonic acids and derivatives thereof (referred to as "taurine and related compounds" hereinafter) with respect to their syntheses and pharmacological activities. Recently, it was found that taurine exhibits an activity of lowering blood pressure, though it is rather slight. Based on this finding, patients were selected with various known hypotensors; some of them indicated relatively great changes in blood pressure and some others indicated almost no improvement with known hypotensors. By administering taurine at the dosage of 6.0 to 9.0 g./day in combination with known hypotensors, it was confirmed that such administration can lower blood pressure within a normal range and mitigates the change in blood pressure, and it also exhibits lowering of cholesterol concentration in the patients of cholesterolemia. However, due to the disadvantage of taurine, that is, it requires a large dose for administration, further investigation was conducted. As a result, it was found that homotaurine, the medicinal use of which, particularly as a hypotensor or an antihyperlipemia agent have not been known, is not only a compound with a very hypotoxic property in either acute or chronic toxicity but also one that exhibits exceptionally excellent activities of lowering blood pressure and cholesterol concentration in blood. Although there are a few reports describing that, in animal experiments, as homotaurine was applied directly to the cerebral cortex or internuron of spinal cord, there was observed an activity of controlling the central nervous system, it is quite a surprising discovery that homotaurine exhibits the above effects, which have never been expected, by means of such applications as oral administration, intrarectal administration, drip phleboclysis and intravenous, intramuscular, hypodermic and intraperitoneal injections.

It was also found that homotaurine exhibits a curative effect even on patients of hypertension to whom any of such known hypotensors as reserpine and chlorothiazide do not give any curative actions.

According to the investigations conducted at the animal experiments using dogs as testing material, when taurine was intravaneously injected at the dose of 1 to 10 mg./kg., a decrease in blood pressure of 20 to 30 mm. Hg continued for 10 to 20 minutes, whereas homotaurine exhibited an equivalent effect with a far smaller amount of 0.001 to 0.1 mg./kg. This fact indicates that, in the case of non-oral administration, homotaurine exhibits an unexpectedly excellent hypotensive activity showing more than 100 times in its efficacy as compared with taurine.

In the animal tests with dogs, the effects and the pressure by administering both homotaurine and taurine of carotid altery was measured while anesthetized with 30 mg./kg. of pentobarbital sodium. From such measurement, it was also confirmed that taurine does not exhibit any hypotensive activity with a dose of either 100 mg./kg. or 200 mg./kg., whereas homotaurine lowered the blood pressure with the same doses by 22 mm. Hg and 50 mm. Hg, respectively.

As a result clinical experiments with the patients of essential hypertension by initiating with 6–9 g./day of taurine orally then alternated with 120 mg./day of homotaurine, a homotaurine lowered the blood pressure by 60 mm. Hg in a patient whose systolic pressure was 200 mm. Hg, while taurine only lowered the pressure by 30 mm. Hg in a patient whose systolic pressure was 180 mm. Hg.

In the preliminary clinical tests further conducted with the patients of hypertension with various conditions, homotaurine was dosed for a consecutive period of time. As a result, it was found that homotaurine was extremely effective for bringing the blood pressure to a normal range and mitigating the change in the blood pressure without exhibiting any subsidiary ill effects, particularly giving no influence to electrolytes, and above all, against hypertension with higher cholesterol concentration, homotaurine significantly showed a remarkable effect interrelated with its lowering activity of cholesterol concentration.

Accordingly, a primary object of this invetion is to provide a pharmaceutical composition having excellent activities of lowering both blood pressure and cholesterol concentration and exhibiting excellent effects for the treatment of hypertension and hyperlipemia with an extremely low toxicity; a method of medical treatment for hypertension and hyperlipemia with the use of such composition; and a process for preparing the active ingredient of such composition more advantageously than in the prior arts.

Other objects and advantages of this invention will be made apparent by the description given hereinbelow.

The active ingredient of this invention, namely, homotaurine is a known compound having the above described structural formula. Its physical and chemical properties and stability are as follows:

(1) PHYSICAL AND CHEMICAL PROPERTIES

Odorless, white, crystalline powder melting at 301–303° C. (decomposition); soluble in water but insoluble in ethanol; acetone and chloroform, (2) STABILITY The stability of the crystal was measured under each of the following conditions, respectively; at room temperature for six months, at 50° C., 60° C. and 70° C., respectively for 8 weeks, at 40° C. under high humidity for 6 weeks, and under ultra-violet irradiation for 8 weeks. In each case neither decomposition nor coloration was observed. It suggests that homotaurine is a very stable compound.

Diseases which can be suitably cured with the use of the compositiion of this invention are as follows:

(A) Hypertension (i) Essential hypertension.

(ii) Hypertension caused by renal diseases, vascular diseases, endocrine diseases, toxemia of pregnancy and neurogenic diseases.

(B) Hyperlipemia

The composition of this invention may be orally or intrarectally administered, or applied by hypodermic, intramuscular and intravenous (including drip phlebolysis) injections. However an oral adminisration is most favorable 50–1,000 mg. of homotaurine/day/man in the former and 0.1–100 mg./day/man in the latter are recommended doses. Because of its extremely low toxicity, it can possibily be administered in a far greater amount.

As the physiologically non-toxic carrier to be used in the preparation of the composition of this invention, diluents, binders, disintegrators and lubricants may be cited which are commonly known in the pharmaceutical field. More specifically, solid diluents such as lactose, white sugar, calcium carbonate, kaolin, metamagnesium alumina silicate, aluminum trihydroxide and sodium hydrogencarbonate; liquid diluents such as water for injection; binders such as gum arabic, gelatin, dextrose solution, sodium alginate, ethanol and distilled water; disintegrators such as starch, calcium carbonate and sodium hydrogencarbonate; and lubricants such as calcium stearate, magnesium stearate, talc, polyethylene glycol and polyoxyethylene monostearate.

There is no specific restriction as to its administering form and the composition of this invention may be administered in any form of powder, tablet, granule, time-releasing tablet, liquid, capsule, coating, injection and in other oral and injectable forms.

In the oral administration it is convenient to administer the composition of this invention in a form of a tablet. In accordance with the ordinary tablet-making method, homotaurine, the active ingredient, and a carrier selected from diluents, binders, disintegrators and lubricants may be formed into tablets. Tablets may be coated, if so desired.

An example of tablet preparation is as follows. Of course, the formulation may be optionally changed according to need, as is well known in the pharmaceutical field.

|  | Mg. |
|---|---|
| Homotaurine | 20 |
| Metamagnesium alumina silica | 60 |
| White sugar | 28 |
| Polyoxyethylene monostearate | 1 |
| Magnesium stearate | 1 |
| Total | 110 |

In the preparation of an injection solution, since homotaurine, the active ingredient, is, as described already, chemically stable, an injection solution can be quite easily prepared in accordance with an ordinary manner with the use of water for injection as its carrier and an indolent agent when necessary. The following is example of an injection solution:

| Homotaurine | 10 mg. |
|---|---|
| Sodium chloride | 4 mg. |
| Water for injection | Balance |
| Total | 1 ml. |

The results of animal tests on toxicity and efficacy of homotaurine and of clinical experiments of therapeutic activities of homotaurine as administered to patients of hypertension and hyperlipemia will be described below.

(I) TOXICITY (1) Acute toxicity

Table I below shows values of acute toxicity ($LD_{50}$ values in 72 hours) of homotaurine to male mice of ddN strain, and male and female rats of S.D. strain. From this table it is seen that homotaurine is of a very low toxicity.

TABLE I.—LD₅₀ VALUES (IN 72 HOURS)

| Class of animals | Administration | Sex | LD₅₀ (mg./kg.) |
|---|---|---|---|
| Mice of ddN strain | Oral | Male | [1] >10,000 |
|  | Hypodermic | do | 6,100 |
|  | Intravenous | do | 3,150 |
| Rats of S.D. strain | Oral | Female | [1] >10,000 |
|  | do | Male | [1] >10,000 |
|  | Hypodermic | Female | [1] >5,000 |
|  | do | Male | [1] >5,000 |
|  | Intravenous | Female | 4,187 |
|  | do | Male | 3,315 |

[1] Minimum fatal dose.

(2) Chronic toxicity

To groups, each of which consists of 10 male and female rats of Donryu strain, homotaurine was orally administered at daily dosages of 100 mg./kg., 500 mg./kg., 1000 mg./kg. and 2000 mg./kg., respectively, for one month. With respect to the following test items no differences from those of the control were observed; body weight increase, blood picture, serum protein, hepatic activity and viscera weight. Further, there was not observed any macroscopic or histodiagnostic abnormalities in the following organs; brain, pituitary body, liver cells, suprarenal gland, kidney, pancreas, digestive system, respiratory system, muscles, heart, spleen, bones, mesenteric glands, skin, seminal vesicle, seminal glands, prostate, ovary and womb.

(II) HYPOTENSIVE ACTIVITY (A) Activity to normal animals

A hypotensive activity was observed in various animals by oral administration or injection of a relatively small amount of homotaurine.

(a) A normal dog (male; about 10 kg. body weight; pentobarbital 30 mg./kg., i.v.): When homotaurine was administered by one intravenous injection in the dose less than 0.01 mg./kg., no change was brought about in blood pressure. With 0.1 mg./kg. of homotaurine, hypotensive activity was continued for about 10 minutes. With 1 mg./kg. or more, the degree of such activity was not intensified but the duration of the activity was prolonged up to 2 hours. No change in the electrocardiograph at the time of lowering of blood pressure even when the amount was increased up to 10 mg./kg. was observed.

By one oral administration of homotaurine in a dose of 100 mg./kg., about 10 mm. Hg was lowered 20 minutes after the administration, and it reached 22 mm. Hg 75 minutes after the administration. The blood pressure returned to its normal state 240 minutes after the administration. No change was observed in the electrocardiograph.

(b) A normal rat (male; Wister strain; 150–240 g. body weight; urethane 1.5 g./kg. i.p.): An intravenous injection of homotaurine 0.1 mg./kg. gave only a transient activity, but with a dose more than 1 mg./kg. of homotaurine, hypotensive activity was observed. With an intravenous injection of homotaurine 10 mg./kg., blood pressure was lowered by 20–25 mm. Hg, which continued for about 15 minutes.

In the case of the oral administration, a similar tendency to the intravenous injection was observed, but in doses of 10 mg./kg. and 100 mg./kg., the duration of such hypotensive activity was extremely prolonged as compared with that of the intravenous injection. More specifically, in a dose of 10 mg./kg. the effect continued for 48 minutes on an average, and with 100 mg./kg. the effect continued for 60 minutes on an average.

(B) Activity to animals of hypertension

Homotaurine exhibits a hypertensive activity to various animals of hypertension.

(a) Spontaneously hypertensive rat (male; 400 g. body weight; B.P. >160 mm. Hg): When homotaurine was intravenously injected, the rat in a dose of 0.5 mg./kg., a transient hypertensive activity was observed. With 1 mg./kg. of homotaurine, such effect continued a relatively longer period. In an amount of 2 mg./kg. the blood pressure was lowered by about 20 mm. Hg. With 30 mg./kg., the blood pressure was lowered by 40 mm. Hg, which continued for more than 20 minutes.

(b) Rat of DDCA hypertension: Homotaurine was orally administered to a rat of hypertension exhibiting an average blood pressure of 172 mm. Hg at dosages of 1 mg./kg., 10 mg./kg. and 100 mg./kg., respectively. In each case, the blood pressure was measured one hour after the administration, and it was observed that the blood pressure was lowered by 13.6 mm. Hg, 24 mm. Hg and 29 mm. Hg, respectively.

(c) Dog of renal hypertension: Homotaurine was continuously administered to the dog at a dosage of 10 mg./kg./day which had been made hypertensive (190 mm. Hg on average) by strangulating the artery of one kidney and then enucleating the other kidney. On the fifteenth day after the commencement of the administration, the blood pressure was lowered by 25 mm. Hg on average. With a consecutive administration of 20 mg./kg./day, a lowering of blood pressure of 58 mm. Hg on average was observed on the fourteenth day.

(III) ACTIVITY TO HYPERLIPEMIA

Hypertension frequently accompanies hyperlipemia. Homotaurine exhibits an excellent activity of removal of cholesterol not only such complicated disease of hypertension and hyperlipemia but also hyperlipemia of a normal blood pressure. An example of experiments of cholesterol-removing activity of homotaurine is stated below.

Effects of homotaurine on lipid metabolism

Effects of homotaurine on lipid metabolism were examined by using rats of Wistar strain of five weeks old. They were fed for one month with a high cholesterol food comprising 2.5% of cholesterol, 0.25% of Nacholate and 0.25% of thiouracil and simultaneously homotaurine was orally administered once a day at dosages of 100 mg./kg. and 500 mg./kg., respectively.

The results are shown in the Table II.

TABLE II

|  | Total cholesterol | Free cholesterol | Phospholipid | Free fatty acid | Triglyceride |
|---|---|---|---|---|---|
| Blood plasma: |  |  |  |  |  |
| Control group, ml./100 ml | 311±19.3 | 159±15.0 | 504±20.0 | 21±1.83 | 180±10.0 |
| Testing group (I) (100 mg./kg. of homotaurine), ml./100 ml | [1] 168±14.3 (54.0) | [2] 106.5±15.3 (67.0) | [1] 391±20.7 (77.5) | [1] 32±2.68 (153.4) | [2] 119±3.45 (79.3) |
| Testing group (II) (500 mg./kg. of homotaurine), ml./100 ml | [1] 156±18.8 (50.0) | [2] 112.0±13.2 (70.4) | [1] 413±10.3 (81.5) | [1] 34±2.69 (161.9) | 131±5.53 (87.3) |
| Liver: |  |  |  |  |  |
| Control group, mg./g | 43.8±3.19 | 24.4±2.06 | 41.5±5.55 | 0.63±0.13 | 11.9±0.04 |
| Testing group (I) (100 mg./kg. of homotaurine), mg./g | [2] 33.4±2.45 (76.3) | [1] 13.1±1.30 (53.6) | 33.6±3.89 (81.0) | 0.37±0.074 (58.7) | [1] 9.4±0.295 (79.0) |
| Testing group (II) (500 mg./kg. of homotaurine), mg./g | 37.0±2.18 (84.5) | [2] 17.9±1.14 (73.4) | 34.6±6.31 (83.4) | 0.58+0.116 (71.6) | 11.8+0.252 (99.2) |

[1] A significant difference of a range of $P<0.01$.
[2] A significant difference of a range of $P<0.05$.
NOTE.—The value of every item is expressed by "average value ±S.E. error"; the figures in parentheses mean the percentage based on the value of the control group.

As is seen from the results given in the Table II, homotaurine is prominently effective for reducing the amount of cholesterol and phospholipid in blood-plasma. More specifically, the total cholesterol value in blood-plasma was reduced to 54% (P<0.01) of the control group in testing group (I) and to 50% (P<0.01) in testing group (II), and the value of free cholesterol in blood-plasma was reduced to 67.0% (P<0.05) in testing group (I) and to 70.4% (P<0.05) in sample group (II). With respect to phospholipid in blood-plasma, a similar tendency was observed. However, with respect to triglyceride in blood-plasma, while a significant decrease was observed only in testing group (I), no significant difference was observed in testing group (II) 500 mg./kg., though a tendency of decrease was observed to some extent.

As compared with the control group, an increase of free fatty acid was recognized in both testing groups.

On the other hand, in the case of liver the free cholesterol value was extremely reduce, e.g., to 53.6% (P<0.01) in testing group (I) and to 73.1% (P<0.01) in testing group (II), whereas a significant decrease in the total cholesterol value was observed only in testing group (I). Although a tendency of decrease was observed in the values of phospholipid and free fatty acid, no significant difference (P<0.05) was recognized from the control group.

The value of triglyceride in the liver decreased significantly only in testing group (I) as in the case of blood-plasma, but no significant decrease was observed in testing group (II).

(IV) OTHER PHARMACOLOGICAL ACTIVITIES

Homotaurine does not exhibit other prominent pharmacological activities in general than such activities as hypotension and removing cholesterol. Further, when homotaurine is administered orally or intravenously in a large dose, it exhibits substantially no activity of controlling the central nervous system.

In this invention, a combined use of known hypotensors, antihyperlipemia agents and/or other vasoactive agents results in synergistic effects. As much agents there are cited barbiturates, tranquilizers, rauwolfia alkaloids and their derivatives, thiazides and their related sulfonamide compounds, methyldopa, guanethidine, veratrum alkaloids, nonoamine oxidase, inhibitors, ganglionic blocking agents, diuretics, vasodilators, adrenochrome, semicarbazone salts, dextran sulfate, nicotin alcohols, nicotinic aids and their derivatives, and Lipostabile (trade name).

Following are several examples of clinical experiments as conducted with the use of homotaurine;

Case No. 1

N.K.—68 of age, male, hypertension and arteriosclerosis.

Chief complaints were headache, heavy feeling in the head and palsy feeling. When he was admitted to the hospital, his blood pressure was 198/110 mm. Hg. Hypertrophy was observed in the electrocardiogram on the right ventricle of the heart. The eyeground bleeding was at the degree of K.W.IIb. Serum electrolytes were normal, but high cholesterol (262 mg./dl.) and β-lipoprotein concentrations (444.6 mg./dl.) were measured. Hepatic and renal functions were normal with no proteinuria.

Immediately after the hospitalizations 3 tablets (3 mg. of active ingredient) of Egalin (a trade name for wolfia alkaloid )and 0.3 mg. of reserpin were administered. On the fifth day the blood pressure was lowered to 156/88 mm. Hg. However, on the eleventh day, the blood pressure was elevated again to 172/94 mm. Hg. Therefore, a single dose of 200 mg. of the homotaurine was administered. The blood pressure on the following day was lowered to 150/70 mm. Hg. From the eighth day after the commencement of the administration the dose was increased to 300 mg. which resulted in the blood pressure lowering to 150/100 mm. Hg. The blood pressure remained normal on the tenth day showing 130/80 mm. Hg and on the fifteenth day showing 140/80 mm. Hg. Even after 6 months from the commencement of the administration, the blood pressure was kept in a stable state.

The values of cholesterol and β-lipoprotein concentrations were measured 2 weeks, 7 weeks and 22 weeks, respectively, after the administration. The cholesterol concentration was prominently decreased to 223 mg./dl., 218 mg./dl. and 204 mg./dl., respectively, and the β-lipoprotein concentration was similarly lowered to 432.8 mg./dl., 357.6 mg./dl. and 311.8 mg./dl., respectively. No side effects were observed.

Case No. 2

K.S.—57 of age, female, hypertension and arteriosclerosis.

The patient first visited the hospital in August 1966, complaining of stiff shoulders and headache insides and back. The blood pressure at the time was 168/102 mm. Hg. An arteriosclerotic picture was observed in the eyeground. The medical treatment was commenced with the administration of reserpine (1 mg.) and trichloromethiazide (2 mg.). The blood pressure was once lowered within a normal range, but in September 1967 an elevating tendency of blood pressure appeared. Therefore, 6 g. of taurine was added to a daily dose. As a result, the blood pressure was decreased again within a normal range. In November 1968 the blood pressure was elevated to 164/110 mm. Hg and the patient complained of a severe headache. Therefore, the treatment with 2 mg. of trichloromethiazide together with 300 mg. of homotaurine was given in place of the former treatment. As a result, the blood pressure was lowered to 142/92 mm. Hg, and the blood pressure was being kept in a stable state. The amount of homotaurine was then reduced to 50–60 mg. in February 1969. In May 1969, the patient still kept a stable blood pressure at 142/92 mm. Hg. No side effect was observed.

Case No. 3

T.S.—41 of age, male, hypertension and arteriosclerosis.

In 1965 the hypertension was detected in a physical check-up. However, the patient had left it untreated until he visited the hospital on Feb. 12, 1969. The blood pressure at that time was 202/102 mm. Hg with no subjective symptoms. On Mar. 8, 1969 the patient was hospitalized because of renal arteriography. A slight arteriosclerotic stricture was observed in the right renal artery. Since the aorta crookedness was extreme, it was deemed that the scleroma was in an advanced state in the belly aorta. According to the electrocardiogram a slight hypertropy was observed on the left ventricle of the heart. At first two tablets (2 mg. of active ingredient) of trichloromethiazide were administered, but no prominent hypotensive effect was observed, showing the systolic pressure of 164–210 mm. Hg and the diastolic pressure of 92–120 mm. Hg. Then, 10 days after the initiation of the administration of trichloromethiazide, homotaurine (120 mg.) was additionally administered. The next day the blood pressure was lowered to 154/100 mm. Hg. Since then the administration was continued and the blood pressure was kept in a normal, stable state while treated with homotaurine. No side effect was observed.

Table III shows the results of other clinical experiments with the use of homotaurine.

TABLE II

| Case | Name | Age | Sex | Disease | Amount administered of homotaurine (mg.) | Administration period (days) | Agent used in combination | Pressure before administration (mm. Hg) | Pressure after administration (mm. Hg) | Cholesterol concentration before administration (mg./dl.) | Cholesterol concentration after administration (mg./dl.) | Secondary ill effect | Evaluation |
|---|---|---|---|---|---|---|---|---|---|---|---|---|---|
| 4 | I.N. | 65 | Female | Hypertension | 120-180 | 35 | | 192/120 | 160/100 | | | Nil | Effective |
| 5 | M.S. | 70 | Male | do | 50-60 | 114 | | 160/88 | 140/72 | 256 | 208 | Nil | Excellent |
| 6 | F.M. | 70 | Female | Hypertension, vascular sclerosis arteriosclerosis, cataract | 60-120 | 42 | Trichloromethiazide (4 mg.) | 192/114 | 140/80 | | | Nil | Do |
| 7 | S.I. | 69 | do | Hypertension, vascular sclerosis arteriosclerosis | 60 | 58 | Reserpine (0.4 mg.) | 162/90 | 114/70 | | | Nil | Do |
| 8 | T.U. | 57 | do | Hypertension, cardiac insufficiency | 60 | 76 | | 170/90 | 132/80 | | | Thirst, heavy feeling in the head | Do |
| 9 | K.Y. | 61 | Male | Hypertension, hyperlipemia, coronary insufficiency | 120 | 21 | Trichloromethiazide (4 mg.) | 170/100 | 150/80 | 286 | 230 | Nil | Do |
| 10 | Y.Y. | 64 | do | Hypertension, cardiac insufficiency | 60 | 59 | | 180/90 | 132/80 | | | Nil | Do |
| 11 | I.G. | 63 | Female | Hypertension, neurosis | 120-150 | 52 | | 170/110 | 140/105 | | | Nil | Do |
| 12 | T.T. | 71 | do | Hypertension | 60 | 101 | | 170/90 | 130/76 | | | Heavy feeling in the head | Do |
| 13 | T.K. | 58 | do | Hypertension, neurosis | 60 | 63 | | 170/110 | 154/80 | | | Nil | Effective |
| 14 | T.T. | 58 | Male | do | 200-300 | 96 | | 184/100 | 140/80 | | | Nil | Excellent |
| 15 | Y.K. | 65 | Female | Hypertension | 120-180 | 85 | | 192/120 | 150/100 | 256 | 208 | Nil | Effective |
| 16 | H.T. | 74 | Male | do | 107 | 81 | | 180/90 | 130/65 | | | Nil | Excellent |
| 17 | S.K. | 67 | Female | Hypertension, neurosis | 50-300 | 325 | | 178/88 | 138/66 | | | Nil | Do |
| 18 | H.M. | 66 | do | do | 20-50 | 50 | Inositol hexanicotinate (1.2 mg.) | 192/122 | 152/80 | | | Nil | Effective |

Various processes for the preparation of homotaurine which is the active ingredient of the composition of this invention have been heretofore presented. However, these known processes are inadequate to be applied in industrial scale, because special apparatus and equipment are required as in Chem. Ber., 96, 3068 (1963) and other references; great amounts of expensive reagents as well as organic solvents and a longer period of time for the completion of the reaction are required as seen in Canadian J. Chem., 40, 2189 (1962); and because a special starting material must be used and the reaction must be conducted under a high pressure system as in specification of U.S. Pat. No. 3,218,352. Therefore, these known processes are not industrially advantageous processes.

Research was made on synthesizing homotaurine as well as pharmacological and pharmaceutical studies on the compound. As a result, the following industrially advantageous process for synthesizing homotaurine was developed.

Accordingly, this invention also provides a process for the preparation of homotaurine which comprises reacting 3-amino-1-propanol in an inert organic solvent with thionyl chloride or a chlorine compound of phosphorus to form 3-amino-1-chloropropane hydrochloride, and reacting the same with an alkali salt of sulfurous acid. The reaction of the above process is expressed by the following formula:

$$NH_2-CH_2-CH_2-CH_2-OH \rightarrow$$
$$NH_2-CH_2-CH_2-CH_2-Cl \cdot HCl \rightarrow$$
$$NH_2-CH_2-CH_2-CH_2-SO_3H$$

The process of this invention has the following advantages:

The starting material is inexpensive and easily obtainable. No special manufacturing equipment is necessary. Each of the operation steps is not complicated. The time required for the synthesis of homotaurine is shortened to about ⅓ to ¼ of the time required in the conventional arts. Homotaurine can be obtained at such a high yield as more 70% based on the starting material.

As chlorine compound of phosphorus having chlorination activity, there are cited, for instance, phosphorus oxychloride, phosphorus pentachloride and phosphorus trichloride. As alkali salt of sulfurous acid to be used as sulfonating agent, for instance, sodium sulfite, potassium sulfite, ammonium sulfite and their acid salts are used.

In addition, compounds capable of acting as alkali salt of sulfurous acid under the reaction conditions may be also used. Examples of such compounds are pyrosulfites such as potassium pyrosulfite, sodium pyrosulfite and ammonium pyrosulfite.

In the practice of the process of this invention, 3-amino-1-propanol in the form of a free base or its salt is first dissolved or suspended in a solvent, and the chlorinating agent is added gradually to the system to advance the reaction. Suitable solvents are inert organic solvents such as aliphatic hydrocarbons, aromatic hydrocarbons, halogenated hydrocarbons, aliphatic esters and cyclic esters. Chloroform and carbon tetrachloride are most preferable. The chlorinating agent may be added in the form of a solution in the solvent. The chlorination reaction is completed within 1 to 10 hours after the addition of the chlorinating agent. The reaction may be promoted by heating. When a suitable solvent is used, the 3-amino-1-chloropropane hydrochloride can be obtained in the form of a complete crystal without any concentration operation. The so obtained intermediate, as it is or after purification, is reacted with an alkali salt of sulfurous acid. This reaction is usually completed within 6 hours. The isolation and purification of the product are conducted in accordance with a customary method. The resulting homotaurine has a high purity as compared with the products of the conventional arts, and only one recrystallization results in the product of substantially 100% purity.

The novel advantageous process for the synthesis of homotaurine, and the formulation of tablets and injection solution are described by referring to following examples.

EXAMPLE 1

3-amino-1-propanol (15 g.) was dissolved into 200 ml. of chloroform. To the solution was added under water cooling and stirring a mixed solution of 20 ml. of thionyl chloride and 50 ml. of chloroform was added over a period of about 1 hour. The stirring was continued for 5 hours while the system was maintained at temperatures approximating the boiling point of the solvent. Primarily an oily substance was precipitated, and then it became viscous gradually. At the final stage it was converted to a white crystal. The crystal was separated by filtration, washed with 50 ml. of acetone and dried to obtain 25 g. (96% yield) of 3-amino-1-chloropropane hydrochloride melting at 140° C. (after recrystallization from a small amount of ethanol).

Analytic values as $C_3H_9NCl_2$. Calculated (percent): C, 27.83; H, 6.93; N, 10.78. Found (percent): C, 27.61; H, 7.08; N, 11.03.

The so obtained 3-amino-1-chloropropane hydrochloride (500 g.) was dissolved in 2 liters of water, and 500 g. of anhydrous sodium sulfite were added to the solution, followed by heating under reflux. About 3 hours later a crystal began to precipitate. After the reaction had been conducted for 6 hours, the reaction mixture was almost solidified under reduced pressure, and 2 liters of hydrochloric acid was added to the solidified residue, followed by removal of insoluble matters from the system by filtration. The filtrate was concentrated under reduced pressure until its volume became 300 ml. The concentrated filtrate was added to 1 liter of methanol followed by cooling. The precipitated homotaurine was separated by filtration and dried. It was then dissolved into water of a volume four times as great as the volume of the homotaurine, followed by addition of methanol of a volume three times as great as the volume of the homotaurine. The precipitated homotaurine was separated by filtration and dried to obtain 380 g. (71% yield) of pure homotaurine melting at 285° C. (decomposition).

Analytic values as $C_3H_9O_3NS$. Calculated (percent): N, 10.00. Found (percent): N, 10.08.

In the known processes for the preparation of homotaurine, recrystallization should be repeated at least three times for obtaining a pure product. On the other hand, in the process of this invention, as described above, homotaurine of a high purity can be obtained by conducting recrystallization only once.

EXAMPLE 2

3-amino-1-propanol (150 g.) was dissolved in 2 liters of chloroform, and dry hydrogen chloride gas was infused into the solution under ice cooling. About 73 g. of the hydrogen chloride gas was absorbed, and 3-amino-1-propanol hydrochloride was precipitated in the form of an oily substance. Then, the system was heated to temperatures approximating the boiling point of the solvent, and a mixed solution of 200 ml. of thionyl chloride and 500 ml. of chloroform was added dropwise under reflux and stirring over about 1 hour. The reflux was further continued for one hour, followed by cooling. The precipitated white crystal was recovered by filtration, washed with 300 ml. of acetone and dried to obtain 253 g. (97.5% yield) of 3-amino-1-chloropropane hydrochloride melting at 140° C.

When the so obtained 3-amino-1-chloropropane hydrochloride was reacted with anhydrous potassium sulfite in the same manner as in Example 1, homotaurine was obtained at a similarly high yield.

EXAMPLE 3

Preparation of tablets

| | G. |
|---|---|
| Homotaurine | 200 |
| Metamagnesium alumina silicate | 600 |
| Powdery sugar | 280 |
| Polyoxyethylene monostearate | 10 |
| Magesium stearate | 10 |

The above ingredients were mixed together, and 150 liters of water and 150 liters of ethanol were added to the mixture. Then, the mixture was formed into 1,000,000 homotaurine tablets in accordance with the wet method.

EXAMPLE 4

Preparation of injection solution

Homotaurine (1 kg.) and sodium chloride (400 g.) were dissolved in 100 liters of water for injection. The solution was filtered and poured into 100,000 ampoules, followed by heat sterilization. Thus 1 ml. ampoules of injection solution each containing 10 mg. of homotaurine were obtained.

EXAMPLE 5

Preparation of capsules

| | G. |
|---|---|
| Homotaurine | 500 |
| Metamagnesium alumina silicate | 1,500 |
| Powdery sugar | 700 |

The above ingredients were mixed. 10,000 hard capsules with 270 mg. each of the mixture were filled to produce capsules containing 50 mg. of homotaurine.

EXAMPLE 6

Preparation of time-releasing tablets

| | G. |
|---|---|
| Homotaurine | 500 |
| Metamagnesium alumina silicate | 600 |
| Powdery sugar | 860 |
| Polyvinyl pyrrolidone | 20 |
| Magnesium stearate | 20 |

Homotaurine, metamagnesium alumina silicate and sugar were mixed together, to form a powdery mixture thereof. To the mixture, a 6% polyvinyl pyrrolidone solution was added and mixed again. The so obtained mixture was formed into granules, dried, and magnesium stearate was added to the granules, mixed together and dried. Then, the mixture was formed into 10,000 time-releasing tablets in accordance with the dry method.

When the disintegrability test on the so obtained tablets was performed using artificial gastric juice, the following results were obtained:

| Time passed (min.) | 20 | 40 | 60 | 80 | 100 | 120 | 180 |
|---|---|---|---|---|---|---|---|
| Disintegrability (percent) | 52 | 62 | 68 | 74 | 78 | 82 | 90 |

What we claim is:

1. A method for the treatment of hypertension in humans, which comprises administering to a human in need of said treatment 3-amino-propane sulfonic acid in an amount capable of lowering blood pressure.
2. The method of claim 1, wherein the administration is an oral or intrarectal administration.
3. The method of claim 2, wherein the amount of said 3-amino-propane sulfonic acid orally or intrarectally administered is in the range of 50 to 1,000 mg./day/man.
4. The method of claim 1, wherein the administration is intravenous administration, intramuscular administration or hypodermic administration.
5. The method of claim 4, wherein the amount of said 3-amino-propane sulfonic acid administered is in the range of 0.1 to 100 mg./day/man.

References Cited

Chemical Abstracts 60: 5338 (b) (1964).

JEROME D. GOLDBERG, Primary Examiner